United States Patent
Bykov et al.

(10) Patent No.: US 9,875,120 B2
(45) Date of Patent: Jan. 23, 2018

(54) VIRTUALIZED COMPONENTS IN COMPUTING SYSTEMS

(71) Applicant: Microsoft Technology Licensing, LLC, Redmond, WA (US)

(72) Inventors: Sergey I. Bykov, Redmond, WA (US); Alan S. Geller, Redmond, WA (US); Gabriel Kliot, Redmond, WA (US); Ravindra Nath Pandya, Clyde Hill, WA (US); Jorgen Thelin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 14/228,129

(22) Filed: Mar. 27, 2014

(65) Prior Publication Data

US 2014/0380318 A1 Dec. 25, 2014

Related U.S. Application Data

(60) Provisional application No. 61/838,835, filed on Jun. 24, 2013.

(51) Int. Cl.
*G06F 9/46* (2006.01)
*G06F 9/455* (2006.01)
*G06F 9/44* (2006.01)

(52) U.S. Cl.
CPC ............ *G06F 9/455* (2013.01); *G06F 9/4428* (2013.01); *G06F 9/465* (2013.01)

(58) Field of Classification Search
None
See application file for complete search history.

(56) References Cited

U.S. PATENT DOCUMENTS

| | | | | |
|---|---|---|---|---|
| 5,948,072 A * | 9/1999 | Cink | ...... | G06F 9/465 719/330 |
| 6,185,695 B1 * | 2/2001 | Murphy | ...... | G06F 11/2028 709/221 |
| 6,519,652 B1 * | 2/2003 | Sadiq | ...... | G06F 17/30607 718/104 |
| 6,571,252 B1 * | 5/2003 | Mukherjee | ...... | G06F 17/30607 |
| 6,631,425 B1 * | 10/2003 | Helland | ...... | G06F 9/4435 719/315 |
| 6,957,427 B1 * | 10/2005 | Wollrath | ...... | G06F 9/548 718/1 |

(Continued)

OTHER PUBLICATIONS

"International Preliminary Report on Patentability Issued in PCT Application No. PCT/US2014/043505", dated Sep. 9, 2015, 8 Pages.

(Continued)

*Primary Examiner* — Mehran Kamran

(57) ABSTRACT

The subject disclosure is directed towards virtual components, e.g., comprising software components such as virtual components of a distributed computing system. Virtual components are available for use by distributed computing system applications, yet managed by the distributed computing system runtime transparent to the application with respect to automatic activation and deactivation on runtime-selected distributed computing system servers. Virtualization of virtual components is based upon mapping virtual components to their physical instantiations that are currently running, such as maintained in a global data store.

20 Claims, 8 Drawing Sheets

(56) References Cited

U.S. PATENT DOCUMENTS

| | | | | |
|---|---|---|---|---|
| 6,970,903 | B1* | 11/2005 | Toivonen | H04L 63/0407 709/201 |
| 6,996,830 | B1* | 2/2006 | Hamilton | G06F 9/468 709/229 |
| 7,516,178 | B1* | 4/2009 | DeFrang | G06F 9/548 709/201 |
| 7,562,369 | B1* | 7/2009 | Salamone | G06F 9/54 719/328 |
| 7,631,078 | B2* | 12/2009 | Ackaouy | H04L 67/2852 707/999.01 |
| 7,924,844 | B1* | 4/2011 | Defrang | H04L 12/5875 370/394 |
| 8,407,448 | B1* | 3/2013 | Hayden | G06F 9/45533 711/162 |
| 8,799,359 | B2* | 8/2014 | Stanev | G06Q 10/06 709/203 |
| 8,804,745 | B1* | 8/2014 | Sinn | H04L 45/42 370/352 |
| 2002/0184444 | A1* | 12/2002 | Shandony | G06F 17/30902 711/118 |
| 2003/0115379 | A1* | 6/2003 | Burton | G06F 9/548 719/330 |
| 2003/0172183 | A1* | 9/2003 | Anderson, IV | H04L 29/12216 709/245 |
| 2003/0182550 | A1* | 9/2003 | Chen | G06F 9/548 713/167 |
| 2003/0208640 | A1* | 11/2003 | Just | G06F 9/548 719/330 |
| 2003/0212736 | A1* | 11/2003 | Kotnur | G06F 9/547 709/202 |
| 2003/0221023 | A1* | 11/2003 | Peddada | G06F 9/548 719/330 |
| 2004/0015953 | A1* | 1/2004 | Vincent | G06F 8/65 717/173 |
| 2004/0158843 | A1* | 8/2004 | Cloccarelli | G06F 9/548 719/330 |
| 2004/0215602 | A1* | 10/2004 | Cioccarelli | G06F 17/3089 |
| 2005/0138647 | A1* | 6/2005 | Bou-Ghannam | G06F 9/542 719/328 |
| 2005/0278339 | A1* | 12/2005 | Petev | G06F 17/30067 |
| 2005/0278689 | A1* | 12/2005 | Gong | G06F 9/5083 717/103 |
| 2006/0031118 | A1* | 2/2006 | Morris | G06Q 30/02 705/14.64 |
| 2006/0123088 | A1* | 6/2006 | Simmons | G06Q 10/109 709/206 |
| 2007/0011444 | A1* | 1/2007 | Grobman | G06F 9/44547 713/2 |
| 2008/0005275 | A1* | 1/2008 | Overton | H04W 4/02 709/218 |
| 2008/0137817 | A1* | 6/2008 | Wilson | H04L 51/36 379/88.17 |
| 2008/0140314 | A1* | 6/2008 | Park | G01C 21/00 701/469 |
| 2008/0172680 | A1* | 7/2008 | Gyorfi | A63F 13/12 719/318 |
| 2008/0282090 | A1* | 11/2008 | Leybovich | H04L 9/006 713/182 |
| 2008/0301640 | A1* | 12/2008 | Keum | G06F 8/61 717/120 |
| 2009/0260002 | A1* | 10/2009 | Volovic | G06F 21/10 717/174 |
| 2009/0292712 | A1* | 11/2009 | Andersson | G06F 9/5088 |
| 2009/0323107 | A1* | 12/2009 | Maeda | G03G 15/50 358/1.15 |
| 2010/0005529 | A1* | 1/2010 | Hemade | H04L 41/0869 726/22 |
| 2010/0185753 | A1* | 7/2010 | Liu | H04L 65/4084 709/219 |
| 2011/0047290 | A1* | 2/2011 | Levett | H04L 29/06 709/238 |
| 2011/0254687 | A1* | 10/2011 | Arponen | H04M 1/72525 340/540 |
| 2011/0296486 | A1* | 12/2011 | Burch | H04L 67/38 726/1 |
| 2012/0005260 | A1* | 1/2012 | Kosaraju | G06F 9/548 709/203 |
| 2012/0017037 | A1* | 1/2012 | Riddle | G06F 17/30519 711/103 |
| 2012/0158996 | A1* | 6/2012 | Thaler, III | H04L 43/0864 709/241 |
| 2013/0198388 | A1* | 8/2013 | Dahn | H04L 29/08 709/226 |
| 2014/0068559 | A1* | 3/2014 | Szocs | G06F 8/38 717/120 |
| 2014/0341085 | A1* | 11/2014 | Suryavanshi | H04L 65/1016 370/260 |
| 2014/0344336 | A1* | 11/2014 | Lopez | G06Q 10/063 709/203 |

OTHER PUBLICATIONS

"International Search Report & Written Opinion Issued in PCT Patent Application No. PCT/US2014/043505", dated Sep. 10, 2014, 8 Pages.

Vinoski, Steve, "CORBA: Integrating Diverse Applications within Distributed Heterogeneous Environments", In Proceedings of the IEEE Communications Magazine, vol. 35, Issue 2, Feb. 1, 1997, pp. 46-55.

Aitenbichler, et al., "Mundocore: A Light-weight Infrastructure for Pervasive Computing", In Pervasive and Mobile Computing, vol. 3, Issue 4, Aug. 2007, pp. 332-361.

"Second Written Opinion Issued in PCT Patent Application No. PCT/US2014/043505", dated May 11, 2015, 7 Pages.

* cited by examiner

VIRTUALIZED COMPONENTS IN COMPUTING SYSTEMS

CROSS-REFERENCE TO RELATED APPLICATION

The present application claims priority to U.S. provisional patent application Ser. No. 61/838,835, filed Jun. 24, 2013.

BACKGROUND

Distributed computing systems may have software components such as software objects or other kinds of individually addressable isolated entities, such as distributed objects, agents, actors and so forth. In general, each such component is individually addressable and has an unique identity, such as an integer, GUID, string or an opaque data structure in one or more implementations).

Typically application code transfers a component's state between server memory and the persistent store, as needed, or such transfer can be automatically performed by the executing runtime system on behalf of the component. One of the common programmability problems in distributed systems is that for most resources, such as a user account, a document, and so forth, an associated component (i.e., object) needs to be explicitly instantiated. The instantiation process usually includes a step of checking if the component exists in memory on one of the servers, and (in many cases) creating the component if it does not already exist; (the actual semantics of the component lookup operation instead of "find" is "find or create").

In a distributed system, this instantiation/creation inherently leads to races when multiple processes check for the existence of an component, and when not found, try to create the component in parallel. A similar race condition issue relates to the deletion of components from memory, particularly when deletion is overlapped with one or more attempts to create the same component. The complexity of such possible situations leads to complex code that needs to handle checks for existence and creation, as well as to handle failures of duplicate creation attempts and inconsistency between the expected and actual state of the component at different points in time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards a virtual component in a system, in which the virtual component is always addressable by an identity of the virtual component. The virtual component is addressable for interaction independent of whether the virtual component is activated in the system or not activated in the system.

In a distributed computing system including servers and a runtime, the runtime may be configured to manage virtual component activation and deactivation state and manage communications to virtual components. This includes preserving a communication to a virtual component that is in a deactivated state.

One or more aspects are directed towards managing activation and deactivation of a virtual component transparent to a program that uses the virtual component, including maintaining information that indicates one or more server locations for any activated instance of the virtual component. One or more communications are sent to a virtual component instance when activated, or preserved when deactivated until an instance of the virtual component is activated into an activation for sending the one or more communications thereto.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a programming model and supporting distributed computing runtime that treats components as virtual entities rather than physical entities. As will be understood, among other benefits this significantly simplifies component management from the programmer's perspective, while providing scalability and reliability. Note that as used herein, "components" refers to other distributed components, objects or actors that are similar in nature.

For instance, a "virtualized distributed component" (or more simply "virtual component") as described herein has an existence that is independent of the lifetime of any of its in-memory instantiations, and thus independent of the lifetime of any particular server. If there is no in-memory instance of a virtual component, a message sent to the component automatically causes a new instance to be created on an available server by the runtime, which may be any available server, for example. The runtime thus gives the developer a virtual "component space" that allows invoking any possible virtual component in the system as if it were present in memory. Thus, virtual components never fail, even if a server crashes, and virtual components do not need to be supervised and/or explicitly recreated by an application.

As will be understood, such virtualization of components is based upon a level of indirection that maps from virtual components to any physical instantiation or instantiations (activations) that are currently running. This level of indirection provides the runtime with the opportunity to handle many problems that otherwise need to be addressed by the application developer, such as virtual component placement and load balancing, deactivation of unused virtual components, and virtual component recovery after server failures. Thus, the virtual component approach described herein significantly simplifies the programming model while allowing the runtime flexibility in balancing load and transparently recovering from failures.

It should be understood that any of the examples herein are non-limiting. For example, virtual components are not limited to any particular distributed system. Further, "virtual component" refers to any software component/software object/virtual actor that has properties that may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in programming, computing systems and distributed computing systems in general.

Figure 1:
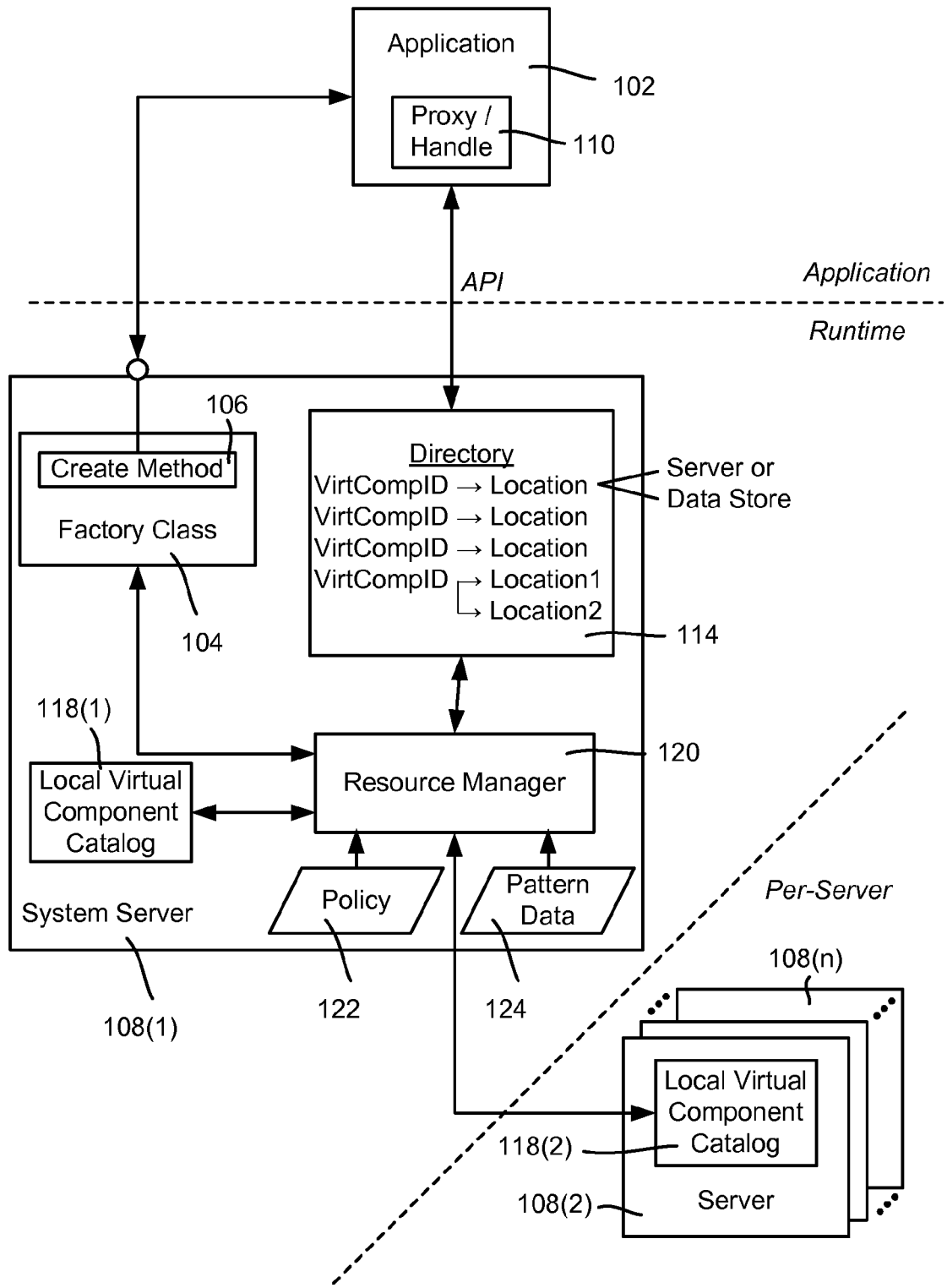
FIG. 1 is a block diagram representing example components of a distributed computing system that may be used in providing and managing virtual components, according to one or more example implementations.

As generally represented in the example implementation of FIG. 1, application code, shown as an application 102, is able to obtain a proxy (e.g., comprising a reference/handle) for a virtual component without checking for the virtual component's existence or current state. In one or more implementations, the application 102, is given a factory class 104 with a method 106 for creating a proxy object for a given virtual component identity. In this way, via a system server 108, the application 102 obtains a proxy object 110 without checking anything about the virtual component, and can issue an operation request to that virtual component immediately.

In general, if a virtual component exists in the system, the virtual component has an always-addressable identity in the virtual component space, whether in an activated state or deactivated state. As a result, an application may send an operation (task) to the virtual component, and virtual components may communicate with one another regardless of their actual current state. If a virtual component is in a deactivated state and is sent a communication, e.g., an operation request and/or a message, (as the activated or deactivated state of the virtual component is unknown to the sender), the runtime takes care of preserving any such operation requests and communications until the virtual component can be activated and provided with the operation request(s) and/or communication(s). Note that there may be rare exceptions to the concept of an "always" addressable and "always" existing virtual component, e.g., the runtime may be programmed to intentionally ignore a request directed to a certain virtual component(s)/an administrator can intentionally remove a certain virtual component(s) from memory and persistent storage. Thus, as used herein, "always" addressable or "always" exists" means "always or substantially always" to account for any such exceptions.

In one or more implementations, a virtual component reference is a strongly-typed virtual proxy that allows other components, as well as non-virtual component client code, to invoke methods and properties on it. For example, virtual component reference can be obtained by calling a method of the factory class 104, which is automatically generated by the runtime at compile time for the corresponding virtual component interface, and explicitly specifies the primary key for that virtual component. A virtual component reference also may be received from a remote method or property return. A virtual component reference can be passed as an input argument to virtual component method calls.

Once created, proxy objects/references thereto may be returned in lists, files and the like, and may be communicated between applications via their virtual components and so forth. Some languages may have implicitly created reference handles at compilation time; method calls are not always needed for an application to have a reference to a constructed one. If the provided identity is invalid, then the virtual component is put into a failure state and fails all incoming requests. If valid, application requests are served by one or more virtual components for the resource.

The operation of obtaining a proxy always succeeds in a functioning distributed system. To this end, the burden of checking for existence and creating the underlying resource is encapsulated in the runtime and is hidden from the application code. As a result, the application code can be written as if the virtual component always exists, which it does, "virtually."

Figure 2:
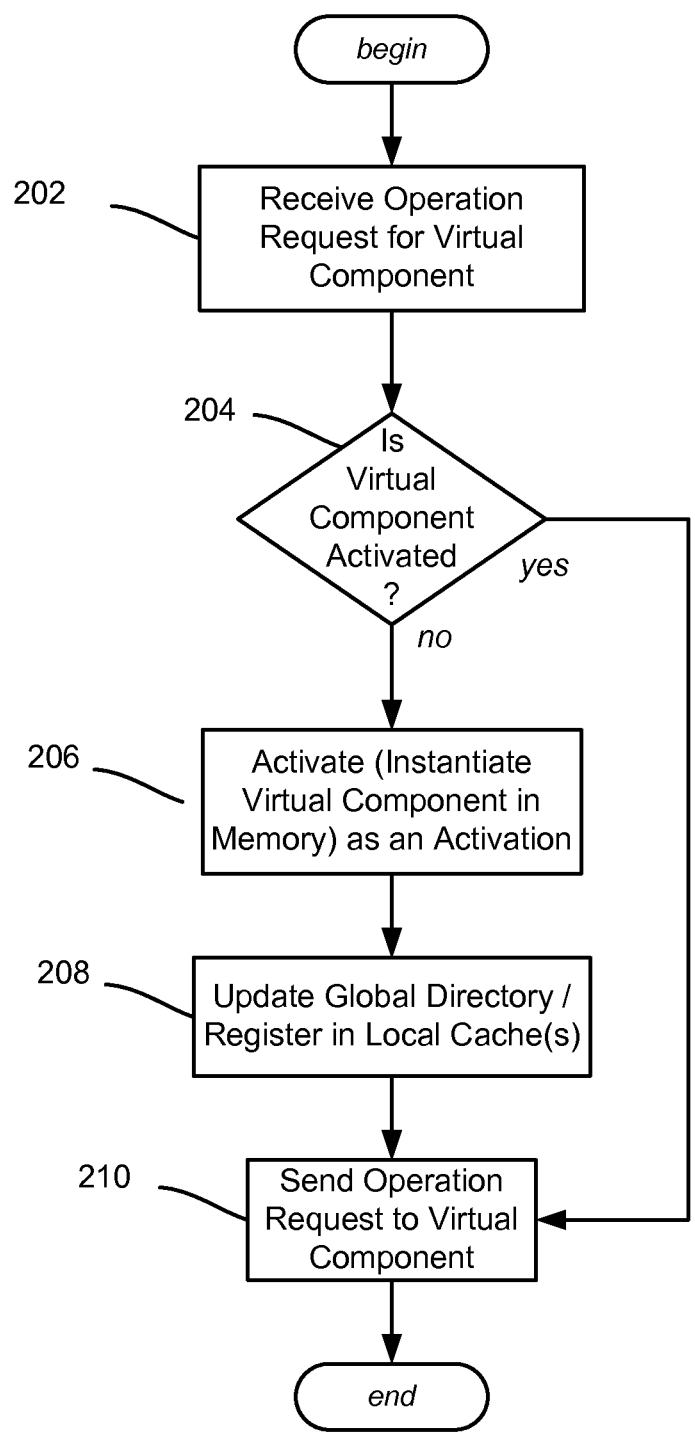
FIG. 2 is a flow diagram having example steps that may be taken to provide an operation request to a virtual component, according to one or more example implementations.

In the example implementation of FIG. 1, the runtime system behind the proxy object, e.g., comprising part of the system server 108(1) in conjunction with other distributed servers 108(2)-108(n) is responsible for finding an existing virtual component or instantiating a new one, if none exists, and routing the operation request to the virtual component. This is generally represented in the example steps of FIG. 2, where at step 202 the operation request is received. Via step 204, if there is no instantiated (activated) virtual component), step 206 instantiates the virtual component as an "activation" while step 208 updates references as to the actual server location of the virtual component, as described below. Step 210 sends the operation request to the virtual component activation. In one or more implementations, it is the responsibility of the virtual component to check for the existence of any corresponding resource or resources and creating them as needed.

Thus, a virtual component as described herein is a virtual entity that always exists logically. At any point in time, there may be zero or more in-memory instances (i.e., activations) for a virtual component. For example, there may not be an in-memory instance of a virtual component if there are no requests pending for that virtual component. When there is work for a non-activated virtual component, the runtime automatically creates a virtual component activation by selecting a server, instantiating on that server the (e.g., .NET) class that implements the behavior of the virtual component, and invoking a method (e.g., the ActivateAsync method) on the activation to initialize the virtual component.

As can be readily appreciated, application code thus may be written in an optimistic style with the assumption that all legitimate requests will be served by the corresponding virtual components. This removes the need to write application code that checks for existence of the virtual component and to create the virtual component if not found, which significantly simplifies the application logic and reduces the amount of code a developer needs to write. Race conditions are also eliminated.

Note that the runtime may support different activation modes for virtual component types, including single activation mode (default), in which only one simultaneous activation of a virtual component is created, and stateless worker mode, in which independent activations of a virtual component may be created automatically by the runtime on-demand (up to a configurable limit) in order to increase throughput. As used herein in this context, "independent activations" implies that there is no state reconciliation between different activations of the same virtual component. Therefore the stateless worker mode is appropriate for virtual components that hold no local state, or virtual components whose local state is immutable, such as a virtual component that acts as a read-only cache of some persistent state. Notwithstanding, in alternative implementations, it is feasible to have multiple activations of the same virtual component that reconcile state.

In one or more implementations, virtual components are isolated from each other, that is, they do not share memory or other state with other virtual components. Instead, virtual components interact by sending messages, which in one or more implementations are reflected as method calls on an virtual component reference (proxy) in the programming model; (in this respect, the runtime follows the standard paradigm).

Figure 3:
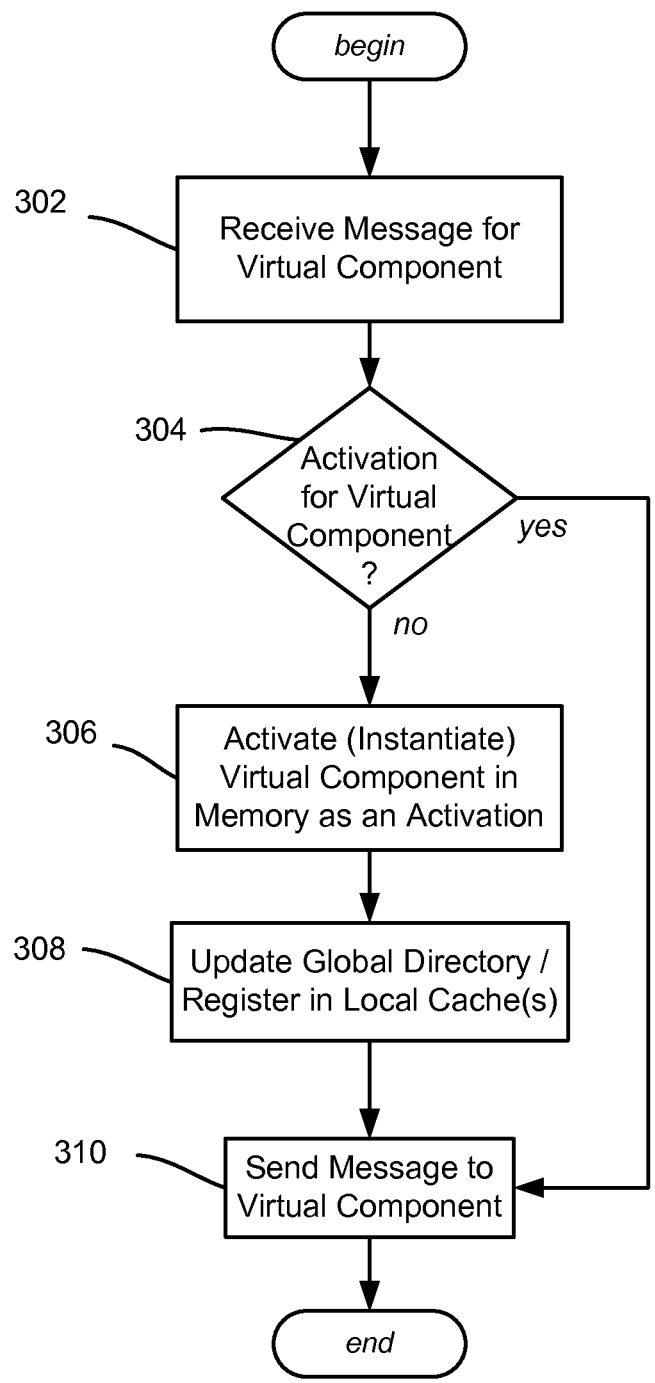
FIG. 3 is a flow diagram having example steps that may be taken to provide a message to a virtual component, according to one or more example implementations.

Message communication is generally represented in the example steps of FIG. 3, where at step 302 a message is received. At step 304, if there is instantiated (activated) virtual component, the message is sent to the virtual component (step 310). If not currently activated as an activation, step 306 instantiates the virtual component and step 308 updates references as to the location of the virtual component, as described below. Step 310 sends the message to the virtual component activation.

The execution of virtual component requests may modify the virtual component's state; the virtual component may or may not have a persistent state. If the virtual component has a persistent state, it is up to the application to decide when to update virtual component's persistent state to synchronize it with the in-memory version. For example, the application can do this when each application request is completed, periodically based on a timer or based on the number of requests processed since the last checkpoint, and/or on some other event.

When the runtime decides to deactivate an activation by reclaiming its in-memory instance, the runtime invokes a method (e.g., the DeactivateAsync method), which gives the virtual component an opportunity to save its state to a persistent storage or perform other cleanup operations.

Figure 4:
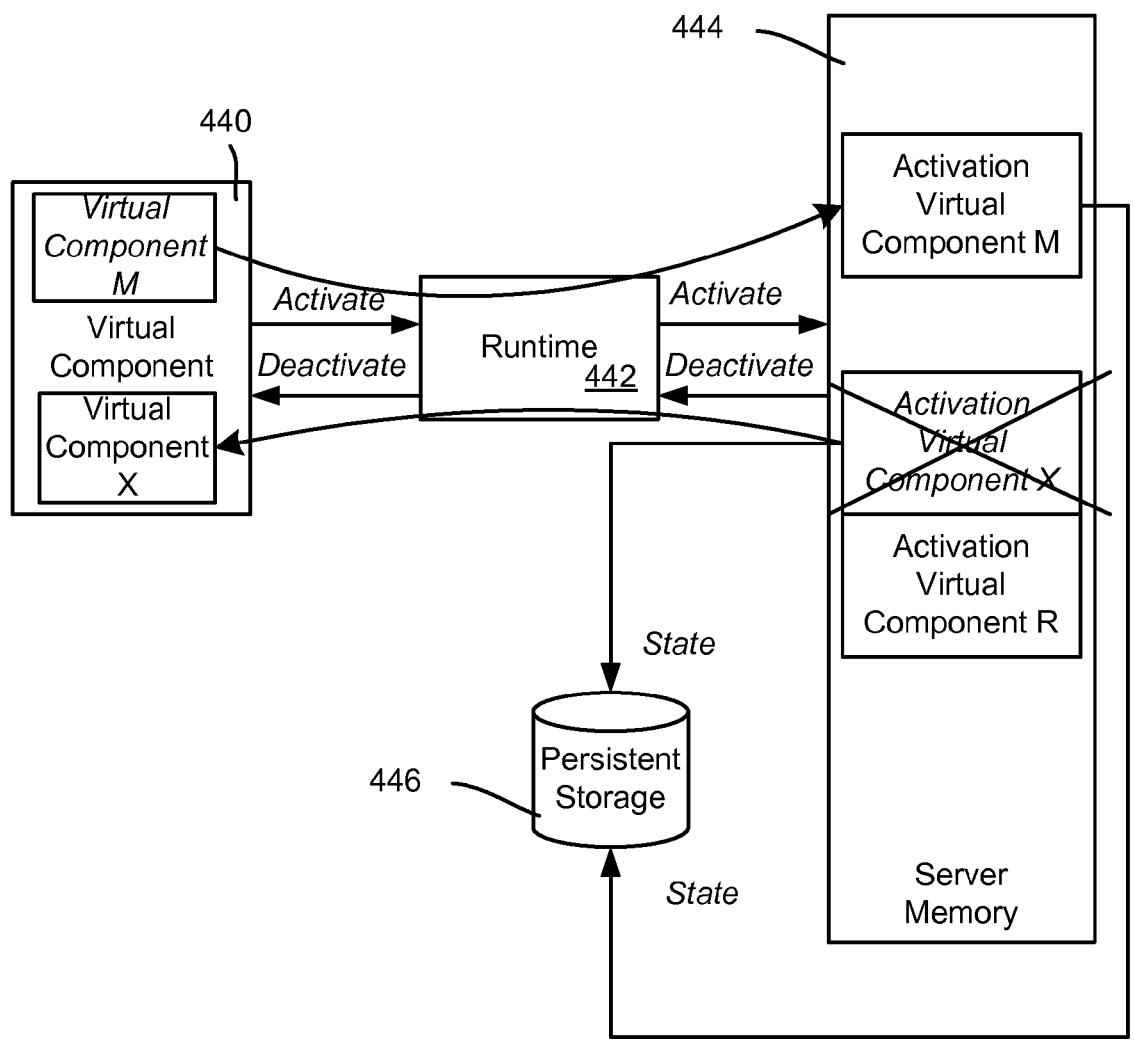
FIG. 4 is a block diagram representing examples of activation and deactivation of virtual components, according to one or more example implementations.

By way of example, FIG. 4 summarizes activation, deactivation and persisting state of a virtual component in one or more implementations. A deactivated virtual component among classes 440 is activated by the runtime 442 into server memory 444 of a selected server, e.g., an activation of virtual component M may be activated from a deactivation as needed. Once activated, the activated virtual component M may recall state and persist state from/to persistent storage 446, if any, as desired. Note that the persistent storage 446 is accessible regardless of the physical server on which a virtual component is currently activated, e.g., via centralized and/or replicated storage, for example.

As also shown in FIG. 4, an activated virtual component X is deactivated by the runtime 444 based upon one or more deactivation criteria, such as based upon (lack of) usage, e.g., when not having performed any work for some time. At any time, and as part of deactivation before deactivation completes, the virtual component X may persist state to the persistent storage 446, if any, as desired. The virtual component X is then deactivated.

In sum, virtual components are logical entities that may exist in different physical locations at different times, and sometimes may not have a physical location at all. Making components virtual entities rather than physical impacts the programming model and implementation. Because virtual component are virtual, they cannot fail; if the server where a virtual component currently is mapped fails, the virtual component's existence is not affected. Instead, the virtual component's mapping to a physical location is changed. As a result, there is no need for a supervision hierarchy as in other runtimes, where it is application's responsibility to recreate a failed virtual component.

Similarly, there is no explicit model for activating an virtual component at a specific location, because whether an virtual component is active or not is transparent to the application. This significantly simplifies the programming model, because it removes the need to explicitly activate or deactivate a virtual component from the application, as well as the need to supervise a virtual component's lifecycle and recreate a virtual component on failures.

Virtual components also significantly simplify the runtime process of paging-out and reclaiming unused virtual components because each virtual component can be independently deactivated and then reactivated later when needed. Note that in other systems, garbage collection needs to be used, which requires tracking all physical references to a virtual component before the virtual component's resources can be reclaimed. Such distributed garbage collection is complicated because it requires coordination protocols and synchronization across many different machines.

A consequence of virtual components is that virtual component proxies (referred to as virtual component references) are virtual as well. Thus, not only does the virtual component reference not expose to the programmer any location information of the target virtual component, it also does not have a notion of binding. In a traditional RPC model the programmer needs to explicitly bind the reference to the service, usually by using an external registry or location service. In the technology described herein, virtual component references are created locally by the sender and are immediately available for use without any need to bind or register them. This simplifies programming and maximizes throughput by allowing immediate pipelining of requests to virtual components without waiting for an equivalent of binding or service endpoint resolution.

In one or more implementations of the runtime, at any given moment an virtual component may have zero, one, or many physical locations. The locations of a virtual component may change from moment to moment and the application code does not know the location of a virtual component. Because of the automatic activation of virtual components, the caller does not know the physical location of the target virtual component, nor know whether the target virtual component has a physical location at all at the moment the request is made.

In general, the runtime achieves location transparency by maintaining virtual component locations in any suitable data store accessible to the runtime, such as a database or directory. In the distributed computing example of FIG. 1, a global directory 114 is exemplified in FIG. 1 as being present on the system server 108(1); however it is understood that the directory is global with respect to runtime access, and may be distributed among servers, replicated to storage devices, made accessible via centralized storage and/or the like. In general, the global directory 114 is protected against server and/or storage failure.

Thus, the technology described herein allows flexible placement of any virtual component by keeping the location of each virtual component in a data store, e.g., a distributed directory. This allows the runtime more freedom in managing CPU, memory, and other resources by placing and moving virtual components as the load on the system changes. Note that in contrast, other distributed systems rely on some deterministic placement method to avoid maintaining an explicit directory of the location of each component; for example, components might be assigned by type, or by consistent hashing, or by range-based partitioning.

The exemplified directory 114 may be implemented in many well-known ways, however one or more implementations use a standard one-hop distributed hash table. Other ways to implement such a data store include a database, disk/file storage-based directories and so forth. In the example implementation shown as the directory 114 of FIG. 1, the directory 114 maps from virtual component ID (VirtCompID) to location (e.g., server memory or a data store), using consistent hashing.

Using a distributed (global) directory 114 for placement and routing implies an additional hop for every message, to find out the physical location of a target virtual component. In one or more implementations, the runtime may reduce the runtime cost of indirection by using local caches, shown in FIG. 1 as local virtual component catalogs 118, that map from virtual component identity to its current physical location. To this end, the local cache (local virtual component catalog) may be maintained on every server with recently used virtual component-to-activation mappings.

Thus, for efficiency, each system server including the server 108(1) may maintain such a cache, which in FIG. 1 comprises the local virtual component catalog (e.g., 118(1)) comprising a mapping from virtual component ID to the location or locations of activations of the virtual component, that is, those in memory on that server 108(1). Each time a new activation is created, a register request is sent to the owner (e.g., server) of the appropriate directory partition. Similarly, every time an activation is deactivated, an unregister request is sent to the partition owner (e.g., server), which may unregister the data from the cache, e.g., delete the information or mark it as unregistered. In this way, the cache/local virtual component catalog is maintained with current information. Note however that a cache is not necessary in all implementations, but rather only an efficient mechanism in certain implementations.

Figure 5:
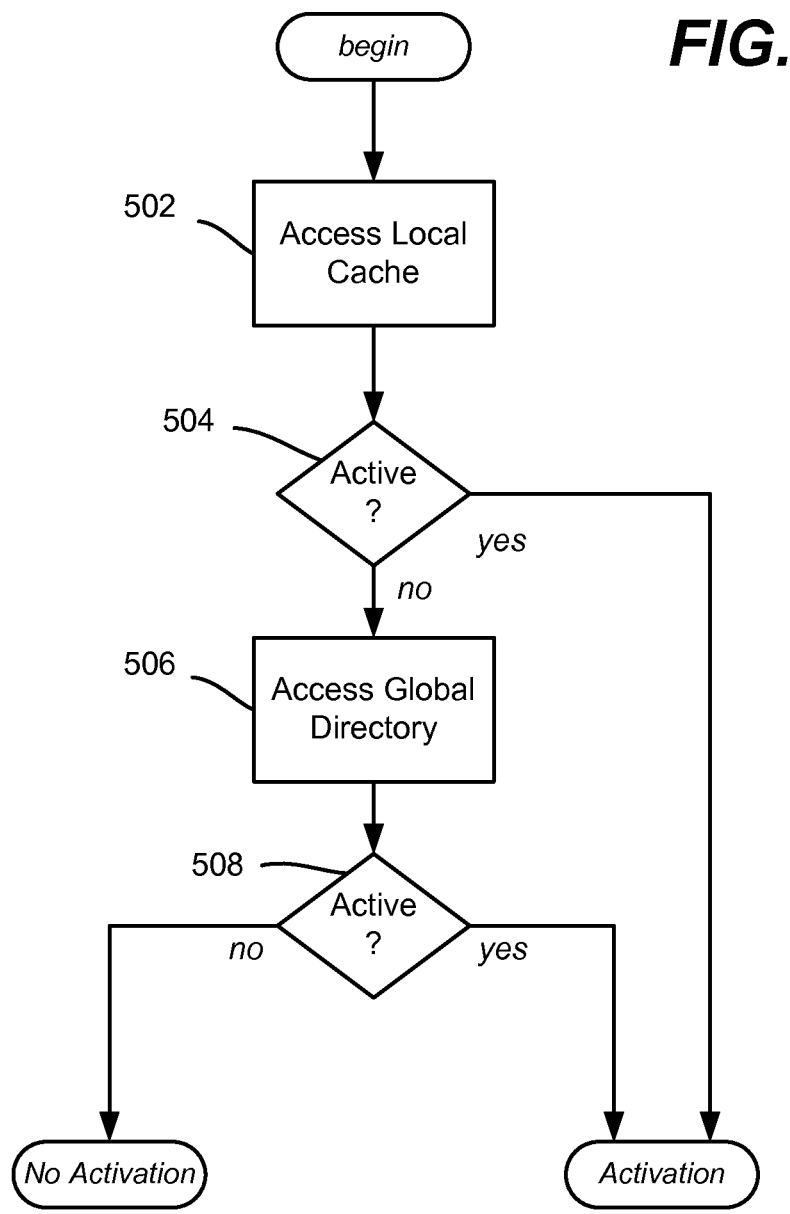
FIG. 5 is a flow diagram having example steps that may be taken to obtain a location of an activated virtual component (activation) or determine that no activation exists, according to one or more example implementations.

FIG. 5 summarizes cache and global directory usage with respect to determining whether an activation exists, such as when a server receives an operation request (FIG. 2) or a message (FIG. 3) for a virtual component. Step 502 represents accessing the local virtual component catalog to see if the virtual component is locally activated (step 504). If so, an activation exists, its location is known, and for example step 204 (FIG. 2) or step 304 (FIG. 3) may act based upon the existence of the activation.

If not found, steps 506 and 508 look for an activation via the global directory. If found, an activation exists, and its location (or locations) is known. If not, there is no current activation. Whether an activation exists or does not, for example, step 204 (FIG. 2) or step 304 (FIG. 3) may act accordingly.

Figure 6:
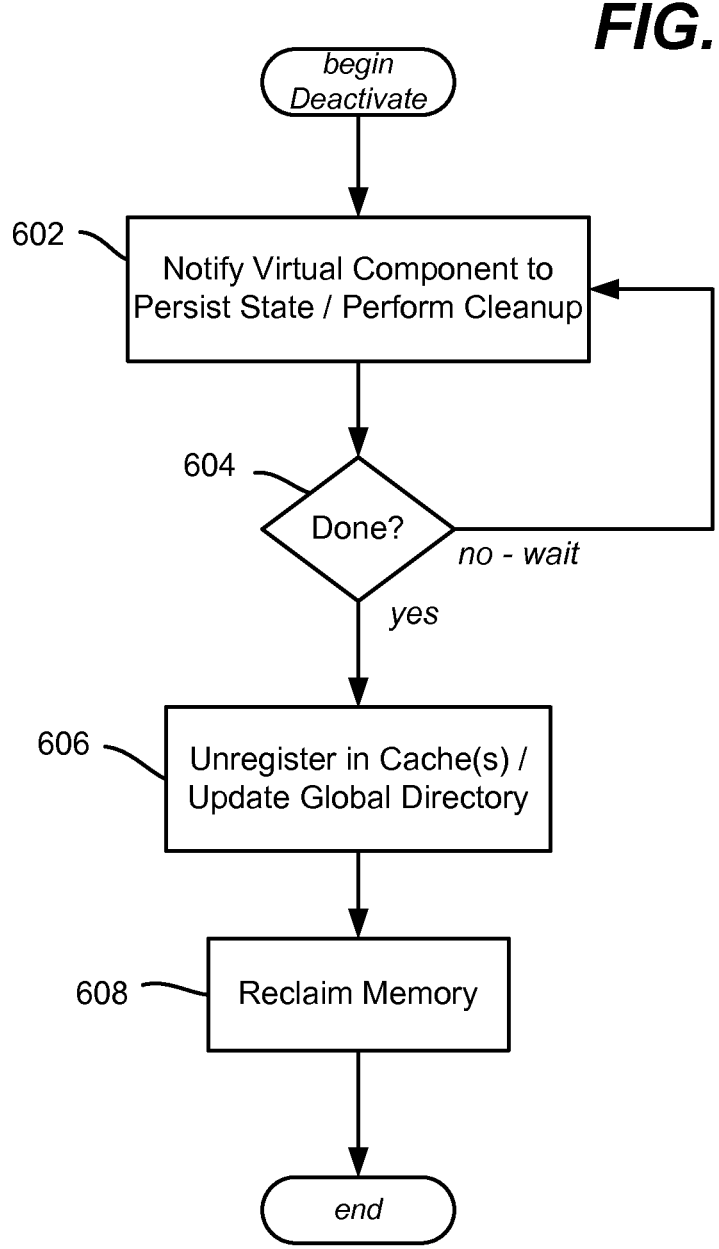
FIG. 6 is a flow diagram having example steps that may be taken as part of virtual component deactivation, according to one or more example implementations.

FIG. 6 summarizes cache and global directory usage with respect to deactivation of a virtual component. Step 602 represents notifying the virtual component of its pending deactivation to give the virtual component the opportunity to persist any state before being deactivated from memory. Step 604 represents waiting, e.g., until the virtual component indicates that deactivation is safe with respect to persisting data, or upon some time limit or the like to deal with failed virtual components. Upon deactivation, step 606 represents "unregistering" the reference from the cache/local virtual component catalog, and also updating the global directory to indicate the virtual component is no longer activated. Step 608 represents reclaiming the memory.

In one or more implementations, local (and possibly global as part of the runtime) register (activation)/unregister (deactivation) operations are performed by a resource manager 120. As described in the above example of FIG. 1, each server that provides resources for an virtual component maintains the local virtual component catalog of its virtual components. The resource manager 120 may activate virtual components as needed, and may deactivate virtual components to reclaim resources, perform load balancing, and so forth, e.g., based upon usage (e.g., active or idle for awhile), load and the like.

The resource manager 120 may use one or more selection criteria to determine where to run an virtual component. For example, load balancing is one consideration, as is maintenance considerations, e.g., if the runtime is informed by an administrator or schedule that a server is to be taken out of service soon that server may not be selected for any new activations.

Another selection criterion consideration is efficiency; for example, a resource Q may be more efficient if loaded on the same server (or some other fast communication channel such as the same server rack) with a resource P. Thus, policy data 122 may specify that virtual components Q and P be activated on the same server, for example.

Further, the resource manager 120 (or another entity coupled thereto) may learn message pattern data 124, e.g., there is a lot of message communication between virtual component J and virtual component K, so for efficiency it makes sense to activate virtual components J and K on the same server/same page or otherwise closely couple them (e.g., in the same server rack). Server selection may be performed upon activation alone, (e.g., always try to activate A and B together at the same location) or by moving a virtual component on demand or the like (e.g., A is communicating a lot with B and they are not closely coupled, therefore deactivate one of them and reactivate elsewhere so as to be closely coupled). Virtual components may be grouped by policy or otherwise; for example, loading a page of memory containing one virtual component automatically will activate any other virtual component(s) on that page.

Thus, policy data and pattern data may be used to determine a server location as to where to activate a currently deactivated virtual component. Similarly, policy and/or pattern data may be used to move a currently activated virtual component's location, e.g., deactivate the virtual component and reactivate the virtual component at a different location based upon policy and/or pattern data.

Note that in one or more alternative implementations, the proxy objects may perform some of the work performed by the directory 114 and/or the resource manager 120, e.g., the lookup and create (if written to be able to deal with load conditions). The application also may perform some of the work to some extent, however in general removing these tasks from application developers is desirable.

With respect to multiple locations for a single virtual component, a virtual component instance may be activated in different locations in the stateless worker mode (in a one-to-many mapping). This allows load balancing among more than one instance of the same virtual component, for example.

In one or more implementations, the single-activation constraint, if used, is enforced by the directory 114, in that if a register request is received for a single-activation virtual component that already has an activation registered, the new activation is not registered and the address of the existing activation is returned. The sending runtime then undoes the redundant activation and forwards the requests to the returned activation of the virtual component.

Another aspect is automatic handling of server failures by the runtime. The runtime is able to transparently (from the application's perspective) reactivate any virtual components on different servers (or a restarted/added server) as desired. This reactivation may be on demand as an application refers to a virtual component, and/or proactively in anticipation of future need. As described herein, policy may be employed in determining reactivation location.

Failure handling is like other aspects of virtual components. An application may send a message to a virtual component regardless of the underlying state, in a server memory, serialized, not-in-existence yet, and so forth, and thus this is independent of whether a server has failed.

As can be seen, there is provided the concept of virtual components, including in a distributed computing system runtime, including managing activation and deactivation of the virtual components. A virtual component in a system is provided, with the virtual component being always addressable by an identity of that virtual component for interaction, independent of whether the virtual component is activated in the system or not activated in the system. For example, upon receiving an operation request or a message directed towards a virtual component, if the virtual component is activated, an activation is located for the virtual component to send the operation request or the message to the activation; if the virtual component is not activated, the virtual component is activated into an activation to send the operation request or the message to the activation. Determining whether the virtual component is activated or not activated may include accessing a local cache, and/or accessing a data store configured to track locations of activations among the servers.

A virtual component activation may be deactivated into a deactivation based upon one or more deactivation criteria. A virtual component may be recovered an activation after failure of one server on which a virtual component was activated by reactivating another activation of the virtual component on another server. A virtual component may be activated by the runtime into a plurality of activations In a distributed computing system including servers and a runtime, the runtime may be configured to manage virtual component activation and deactivation state and manage communications to virtual components. This includes preserving a communication to a virtual component that is in a deactivated state.

The runtime may be configured to maintain a global data store including a server location of each activated virtual component. The runtime may be configured to update a cache of local information on a server, including providing registration data that indicates that a virtual component is activated on the server or is being activated on the server, and deregistration data that indicates that the virtual component is deactivated on the server or is being deactivated on the server. The runtime may deactivate an activated virtual component into a deactivated state after allowing the virtual component to persist state, and reactivate the virtual component from the deactivated state into an activated state, including allowing the virtual component to recall persisted state.

One or more aspects are directed towards managing activation and deactivation of a virtual component transparent to a program that uses the virtual component, including maintaining information that indicates one or more server locations for any activated instance of the virtual component. One or more communications are sent to a virtual component instance when activated, or preserved when deactivated until an instance of the virtual component is activated into an activation for sending the one or more communications thereto.

Managing activation and deactivation of the virtual component may include deactivating an activation of the virtual component on one server and reactivating an activation of the virtual component on another server, or activating a virtual component that was activated on a failed server as an activation of the virtual component on another server. Managing activation and deactivation of the virtual component may comprise selecting a server for activating the virtual component based upon evaluating one or more selection criteria, including load, maintenance, policy data or pattern data.

The managing may include maintaining global information by which the locations of activated virtual components in the distributed computing system are tracked by the runtime. Upon receiving an operation request for a virtual component, the runtime determines whether an activation exists for the virtual component, and if an activation exists, obtains a location of the virtual component (which may be part of the same step as determining existence), and provides the operation request to the activation. If an activation does not exist, the runtime automatically activates the virtual component from a deactivation into an activation, and provides the operation request to the activation.

In one or more aspects, maintaining the global information by which the locations of activated virtual components in the distributed computing system are tracked by the runtime may comprise updating the global information as part of automatically activating the virtual component. Managing the activation and deactivation of the virtual component may comprise deactivating the virtual component based upon one or more deactivation criteria; maintaining the global information may comprise updating the global information as part of deactivating the virtual component. A deactivated virtual component may be allowed to persist state.

In one or more aspects, automatically activating the virtual component comprises selecting a location for the activation based at least in part upon one or more selection criteria, such as policy data and/or pattern data. The activation is instantiated on a selected server, and a cache of local information on the server may be maintained, including registration data that indicates that the activation is on the selected server. The registration data is unregistered from the cache upon deactivation.

In one or more implementations, a distributed computing system includes a plurality of servers and a runtime, with the runtime configured to maintain a global data store (e.g., directory) of virtual components, each virtual component managed by the runtime. The runtime is configured to locate an activation for a currently activated virtual component to perform an application-requested operation or to send a message to the virtual component; activate a virtual component into an activation if not currently activated to perform an application-requested operation or to send a message to the virtual component; and/or deactivate a virtual component based upon one or more deactivation criteria (e.g., based upon load balancing, usage data, policy data, or pattern data). In one or more aspects, a virtual component may be activated into a plurality of activations in a stateless worker mode.

The runtime may be configured to maintain the global directory of virtual components including to maintain a server location of each activated virtual component, and/or maintain a data store location of each deactivated virtual component. The runtime may select a server on which the virtual component is activated into the activation.

A resource manager may be coupled to or configured as part of the runtime. The resource manager may be configured to maintain a cache on the server to track that an activation exists on the server.

One or more aspects are directed towards receiving an operation request or a message directed towards a virtual component and determining whether an activation for the virtual component currently exists. If so, a server location of the virtual component is obtained. If not, a server is selected and the virtual component activated on the server into an activation; the virtual component is associated with a server location corresponding to the selected server. The operation request or the message is sent to the virtual component at the server location.

To determine whether an activation for the virtual component currently exists, one or more aspects are directed towards accessing a local catalog, and if not found in the local catalog, accessing a global directory. Determining whether an activation for the virtual component currently exists may comprise attempting to obtain a server location of the virtual component.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage. It is understood that the system setup may be native mode operation (e.g., directly on hardware) or a virtualized environment, or a combination of both.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
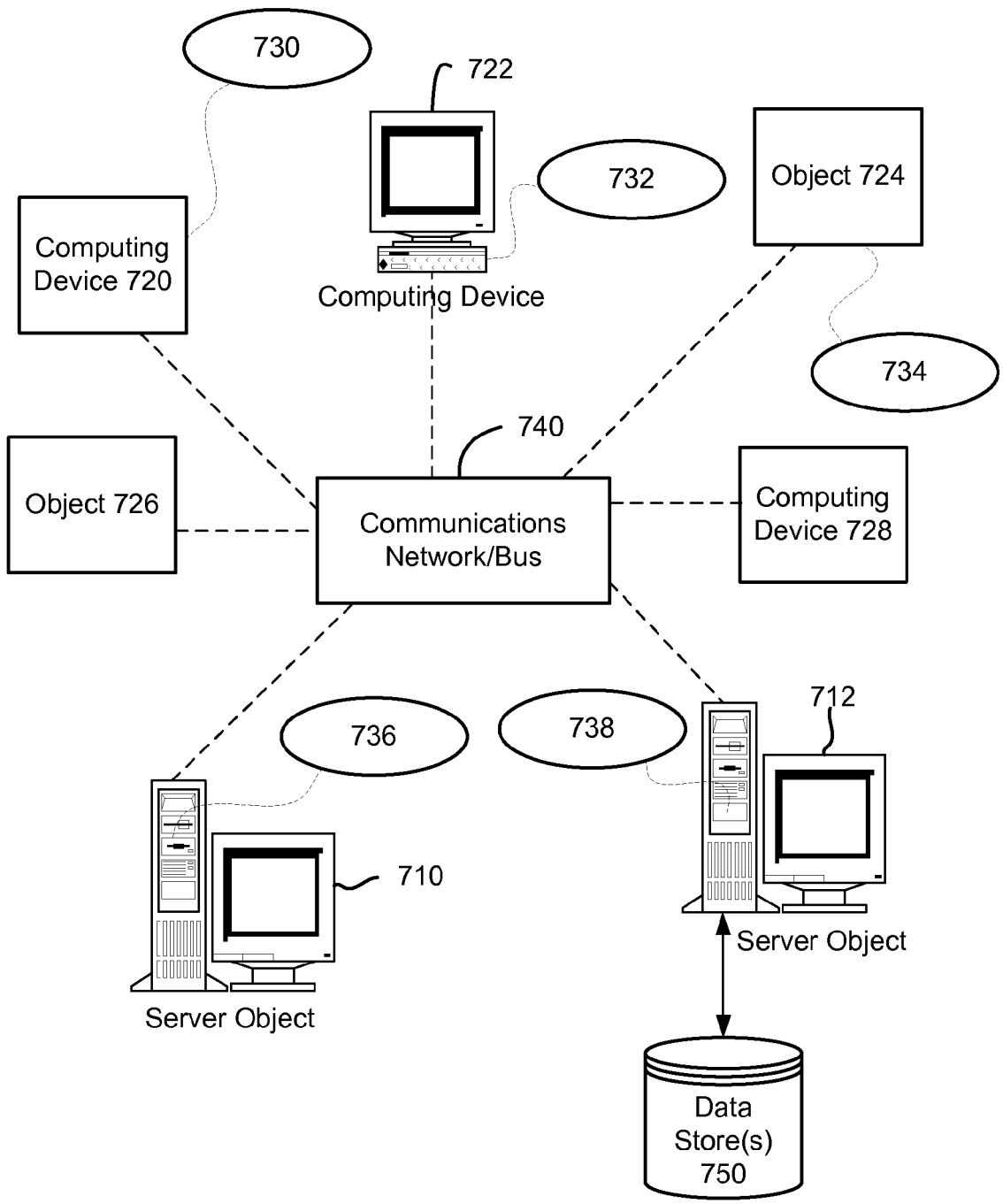
FIG. 7 is a block diagram representing an example non-limiting networked or distributed computing environment into which one or more aspects of various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
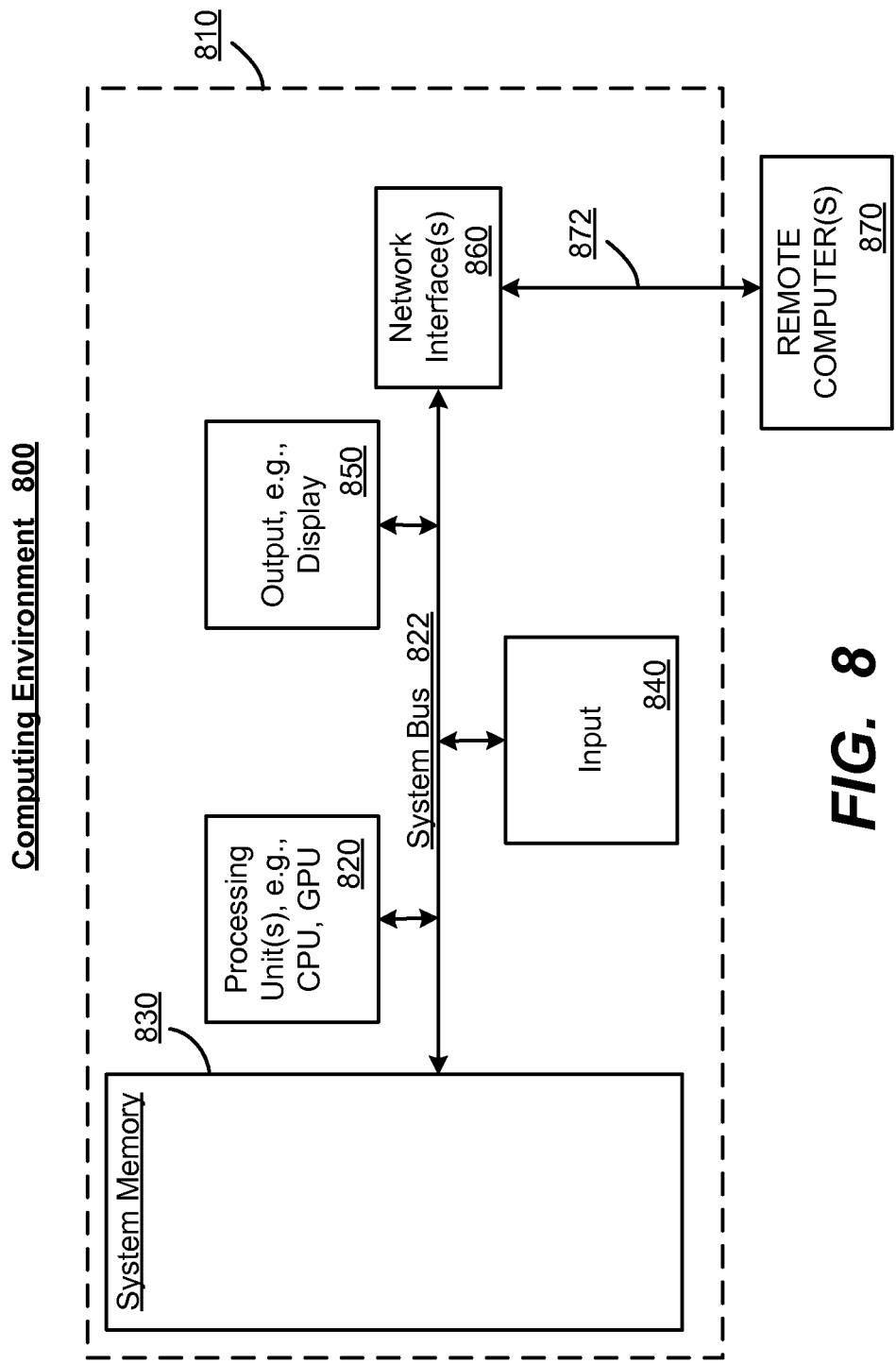
FIG. 8 is a block diagram representing an example non-limiting machine/computing device into which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of machine/computer-readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
  providing first and second virtual components that are addressable by respective first and second identifies, the first and the second virtual components addressable for interaction independent of whether the first and the second virtual components are activated;
  at runtime, performing the following transparent to programs that use the first and the second virtual components:
  managing activation and deactivation of the first and the second virtual components transparent to programs that use the first and the second virtual components, wherein said managing activation and deactivation of the first and the second virtual components comprises selecting a server for activating the first or the second virtual component based upon evaluating one or more selection criteria comprising at least one of load, scheduled maintenance, policy data or pattern of communication among components,
  receiving an operation request related to the first virtual component,
  determining the first virtual component has not been activated,
  selecting a server for activating an instance of the virtual component,
  sharing operation instructions between the first and the second virtual components while the first virtual component is not activated,
  preserving the shared operation instructions until the first virtual component is activated on a server,
  incident to receipt of the shared operation instructions, signaling activation of the first virtual component on the server,
  upon activation of the first virtual component, forwarding the shared operation instructions to that component, and
  maintaining information that indicates one or more server locations for an activated instance of the first or second virtual components in a global data store.

2. The method of claim 1 further comprising, activating, during the runtime, the first virtual component into an activation to send the operation request to the activation.

3. The method of claim 2 further comprising, determining whether the first virtual component is activated or not activated through accessing a local cache.

4. The method of claim 2 further comprising locating the activation through accessing a data store configured to track locations of activations among one or more servers.

5. The method of claim 1 further comprising, deactivating the activation into a deactivation based upon one or more deactivation criteria.

6. The method of claim 2 wherein activating the first virtual component into the activation comprises selecting a server location for the activation based at least in part upon the policy data, or the pattern data.

7. The method of claim 1 further comprising, recovering the first virtual component after failure of the server on which the virtual component was activated through reactivating another activation of the first virtual component on another server.

8. A system comprising:
  a plurality of servers; and
  a runtime configured to manage virtual component activation and deactivation state and manage communications to virtual components, the runtime configured to:
  provide first and second virtual components with respective always-addressable identities;
  manage activation and deactivation of the first and the second virtual components transparent to programs that use the first and the second virtual components, wherein said managing activation and deactivation of the first and second virtual components comprises selecting a server for activating the virtual component based upon evaluating one or more selection criteria, including at least one of load, scheduled maintenance, policy data or pattern of communication among components;

receive an operation from a program for the first virtual component while the first virtual component is not activated;

share operation instructions between the first and the second virtual components while the first virtual component is not activated; and preserve the shared operation instructions until the first virtual component is activated on a server;

incident to receipt of the shared operation instructions, signaling activation of the first virtual component on the server;

upon activation of the first virtual component, forwarding the shared operation instructions to that component; and maintaining information that indicates one or more server locations for an activated instance of the first or second virtual components in a global data store.

9. The system of claim 8 wherein the virtual first component is activated by the runtime into a plurality of activations.

10. The system of claim 8 wherein the runtime is configured to maintain the global data store to include server locations of the activated first virtual component.

11. The system of claim 8 wherein the runtime is configured to update a cache of local information on the server, including to provide registration data that indicates that the first virtual component is activated on the server or is being activated on the server, and deregistration data that indicates that the virtual component is deactivated on the server or is being deactivated on the server.

12. The system of claim 8 wherein the runtime is configured to:
a) deactivate an activated virtual component into a deactivated state after allowing a state of the first virtual component to persist, and
b) reactivate the virtual component from the deactivated state into an activated state, including allowing the first virtual component to recall the persisted state.

13. The system of claim 8 wherein the runtime manages a communication to the first virtual component through:
a) locating an activation for a currently activated instance of the first virtual component for sending a communication to the activation; or
b) activating the virtual component into an activation if not currently activated to send a preserved communication to the activation.

14. One or more computer hardware memory devices embodied with machine-readable instructions that, when executed, perform steps, comprising:

providing first and second virtual components with respective always-addressable identities;

managing activation and deactivation of the first and second virtual components transparent to programs that use the first and the second virtual components, wherein said managing activation and deactivation of the first and second virtual components comprises selecting a server for activating the first or the second virtual component based upon evaluating one or more selection criteria comprising at least one of load, scheduled maintenance, policy data or pattern of communication among components;

receiving an operation from a program for the first virtual component while the first virtual component is not activated;

sharing operation instructions between the first and the second virtual components while the first virtual component is not activated; and preserving the shared operation instructions until the first virtual component is activated on a server;

incident to receipt of the shared operation instructions, signaling activation of the first virtual component on the server;

upon activation of the first virtual component, forwarding the shared operation instructions the activated first virtual component; and maintaining information that indicates one or more server locations for an activated instance of the first or the second virtual components in a global data store.

15. The one or more computer memory devices of claim 14 wherein said managing the activation and deactivation of the first and the second virtual components comprise deactivating at least one virtual component based upon one or more deactivation criteria.

16. The one or more computer memory devices of claim 14 further comprising recovering the first virtual component after failure of a server on which the virtual component was activated through reactivating another activation of the first virtual component on another server.

17. The one or more computer memory devices of claim 14 further comprising maintaining information that indicates one or more server locations for any activated instance of the first or the second virtual components in at least one local cache.

18. The one or more computer memory devices of claim 14 wherein sending the one or more communications to the virtual component comprises sending an operation request from an application to the first virtual component, or sending a message to the first virtual component, or both sending an operation request from an application to the first virtual component and sending a message to the first virtual component.

19. The one or more computer memory devices of claim 14 further comprising deactivating activation of the first virtual component on the server and reactivating an activation of the first virtual component on another server.

20. The one or more computer memory devices of claim 14 wherein managing activation and deactivation of the first and second virtual components comprises selecting a server for activating the second virtual component based upon evaluating the one or more selection criteria comprising the, load, scheduled maintenance, policy data or pattern of communication among components.

* * * * *